United States Patent
Alacar (10) Patent No.: US 9,854,106 B1
(45) Date of Patent: Dec. 26, 2017

(54) IMAGE FORMING DEVICE INSTALLATION SUPPORT SERVER, METHOD, AND RECORDING MEDIUM FOR CALCULATING A SCORE OF A LOCATION FOR A NEW PRINT SHOP

(71) Applicant: KYOCERA Document Solutions Inc., Osaka (JP)

(72) Inventor: Arthur Alacar, Pacheco, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/253,554

(22) Filed: Aug. 31, 2016

(51) Int. Cl.
*H04N 1/00* (2006.01)

(52) U.S. Cl.
CPC ..... *H04N 1/00039* (2013.01); *H04N 1/00015* (2013.01); *H04N 1/00344* (2013.01); *H04N 2201/0094* (2013.01); *H04N 2201/3207* (2013.01)

(58) Field of Classification Search
None
See application file for complete search history.

(56) References Cited

U.S. PATENT DOCUMENTS

| | | | | |
|---|---|---|---|---|
| 2001/0043357 | A1* | 11/2001 | Owa | G06F 3/1204 358/1.15 |
| 2001/0052995 | A1* | 12/2001 | Idehara | G06F 3/1204 358/1.15 |
| 2003/0101342 | A1* | 5/2003 | Hansen | G06F 21/35 713/167 |
| 2003/0107762 | A1* | 6/2003 | Kinoshita | G06Q 10/107 358/1.15 |
| 2005/0248805 | A1* | 11/2005 | Shima | H04N 1/00244 358/1.15 |
| 2007/0109586 | A1* | 5/2007 | Yamada | G06F 3/121 358/1.14 |
| 2009/0248632 | A1* | 10/2009 | Subramanian | G06Q 30/06 |
| 2010/0007910 | A1* | 1/2010 | Martin | G06F 3/1211 358/1.15 |
| 2011/0141518 | A1 | 6/2011 | Kayama | |
| 2011/0299120 | A1* | 12/2011 | Sekine | G06F 3/1221 358/1.15 |
| 2012/0140285 | A1* | 6/2012 | Kamath | G06F 3/1204 358/1.15 |

(Continued)

*Primary Examiner* — Ming Hon
(74) *Attorney, Agent, or Firm* — Hawaii Patent Services; Nathaniel K. Fedde; Kenton N. Fedde (57) ABSTRACT

Provided is support server 1 that is an image forming device installation support server. Location information acquiring part 100 inputs location information 200 from terminal 2. Place information acquiring part 110 obtains place information 210 including a nearby building and street in an address corresponding to location information 200 obtained by location information acquiring part 100. Image forming device information acquiring part 120 obtains image forming device information 220 including the installed location and printing number of sheets of a nearby image forming device in the address corresponding to location information 200 obtained by location information acquiring part 100. Scoring part 130 calculates suitability score 250 as a new print shop's installation location from place information 210 and image forming device information 220. Suitability score outputting part 140 outputs suitability score 250.

20 Claims, 6 Drawing Sheets

(56) References Cited

U.S. PATENT DOCUMENTS

| | | |
|---|---|---|
| 2012/0268765 A1 | 10/2012 | Yamade |
| 2013/0107324 A1* | 5/2013 | Kamath .............. G06F 3/1222 358/1.15 |
| 2013/0329246 A1* | 12/2013 | Parida ................ G06F 3/1203 358/1.15 |
| 2014/0233065 A1* | 8/2014 | Fischer ............... G06F 3/1208 358/1.15 |
| 2014/0295876 A1* | 10/2014 | Merriam .............. H04W 4/02 455/456.1 |

* cited by examiner

IMAGE FORMING DEVICE INSTALLATION SUPPORT SERVER, METHOD, AND RECORDING MEDIUM FOR CALCULATING A SCORE OF A LOCATION FOR A NEW PRINT SHOP

BACKGROUND

Image forming devices, such as an MFP (Multifunctional Peripheral,) that can print a document and an image, are present.

The print shop that is a store arranged such an image forming device is expanded in recent years.

Business people and consumers generally use a print shop.

Such a print shop is often located in front of a university.

Also, another print shop is sometimes located in a business district.

A print shop's owner needs to take into consideration where new print shop should be opened or whether it should be relocated.

On the other hand, a typical method of determining an optimum layout for many image forming devices in an office is also disclosed.

For example, with this method, the actions (time and a movement path after issuing a printing instruction by a user on a seat and the user acquires a printed matter, and time and a movement path after acquiring the printed matter and the user returns to the seat, or the like) accompanying printing instructions of the user who instructs printing for a shared printer are detected in a detecting part.

Then, the importance of a print job according to the printing instruction is determined based on the detected action of the user.

Next, the importance of the print job is added for each user. Finally, a location of the printer is evaluated based on the added result for each user.

SUMMARY

An image forming device installation support server in the present disclosure includes a location information acquiring part, a place information acquiring part, an image forming device information acquiring part, a scoring part, and a suitability score outputting part. The location information acquiring part inputs location information from a terminal. The place information acquiring part obtains place information including the nearby building and street in an address corresponding to the location information obtained by the location information acquiring part. The image forming device information acquiring part obtains image forming device information including the installed location and printing number of sheets of a nearby image forming device in the address corresponding to the location information obtained by the location information acquiring part. The scoring part calculates a suitability score as a new print shop's installing location by using the place information obtained by the place information acquiring part and the image forming device information obtained by the image forming device information acquiring part. The suitability score outputting part outputs the suitability score calculated by the scoring part.

An image forming device installation support method in the present disclosure includes the following steps. At first, location information is inputted from a terminal. Then, place information including a nearby building and street in an address corresponding to the obtained location information is obtained. Then, image forming device information including an installed location and printing number of sheets of a nearby image forming device in the address corresponding to the obtained location information is obtained. Then, the suitability score as a new print shop's installation location is calculated from the obtained place information and the obtained image forming device information. Then, the calculated suitability score is outputted.

A recording medium of the present disclosure is a non-transitory recording medium or readable and executable for an image forming device installation support server stores program including the following steps. At first, location information is inputted from a terminal. Then, place information including a nearby building and street in an address corresponding to the obtained location information is obtained. Then, image forming device information including an installed location and printing number of sheets of a nearby image forming device in the address corresponding to the obtained location information is obtained. Then, the suitability score as a new print shop's installation location is calculated from the obtained place information and the obtained image forming device information. Then, the calculated suitability score is outputted.

DETAILED DESCRIPTION

Embodiment

[A System Configuration of an Image Forming Device Installation Support System X]

Figure 1:
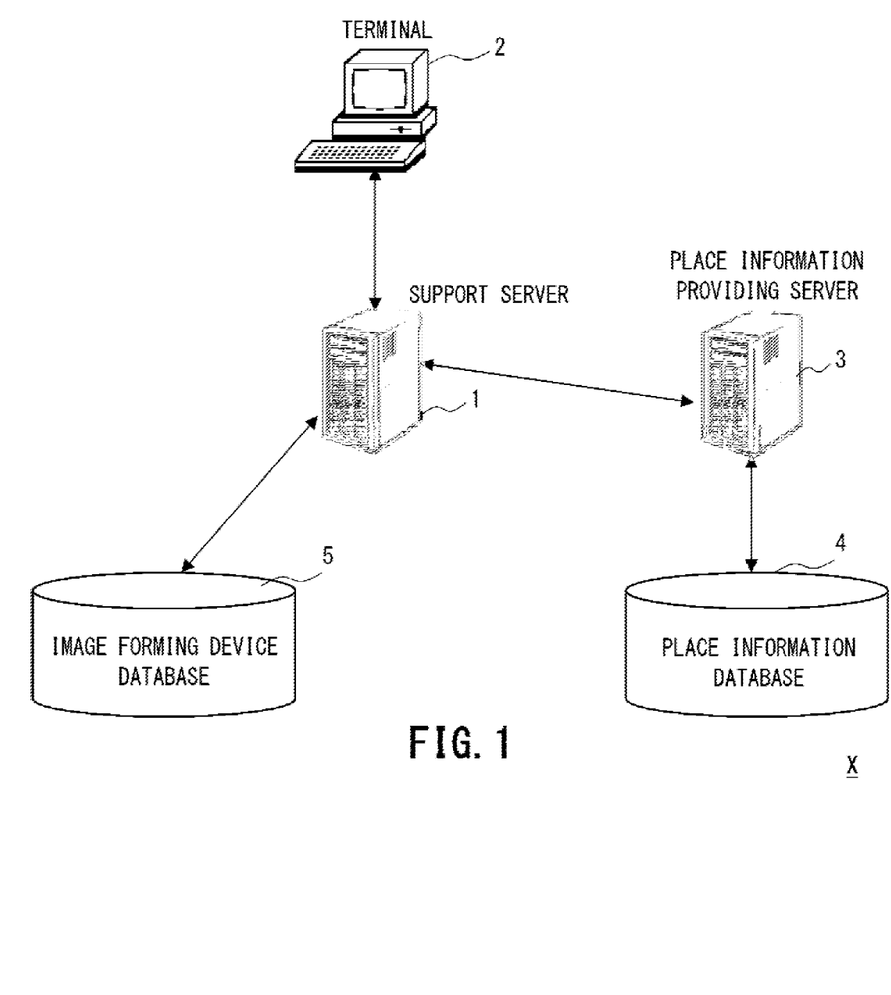
FIG. 1 is a system configuration figure of an image forming device installation support system according to an embodiment in the present disclosure.

First, FIG. 1 is referred to.

The configuration of image forming device installation support system X according to the embodiment in the present disclosure is explained.

Image forming device installation support system X is a system for supporting where users, such as a print shop's owner, establish or relocate a new print shop.

Also, image forming device installation support system X can be used when installing and relocating an image forming device.

Image forming device installation support system X includes support server 1, terminal 2, place information providing server 3, place information database 4, and image forming device database 5.

Support server 1 is an image forming device installation support server to be accessed by a user.

Support server 1 may be a server on "the cloud."

In addition, support servers 1 may be a local server.

Also, support server 1 may be a combination with a server on the cloud and a local server.

Terminal 2 is an information processing equipment, such as a PC (Personal Computer,) a portable terminal, or the like, which a user accesses to support server 1.

Terminal 2 executes a web browser, an exclusive application program, or the like, and accesses to support server 1.

Place information providing server 3 is a server that provides place information 210.

For example, when location information 200 and specific information about searching is selected and is accessed, place information providing server 3 searches place information 210 by using place information database 4 and outputs to the accessing source.

For example, place information providing server 3 may be accessed by using place information acquisition API on a cloud, such as Google (registered trademark) places API (Application Programming Interface) "https://developers.google.com/places/".

Place information database 4 is a database that is accessed by place information providing server 3 and in which place information 210 is stored.

The database may be based on SQL, for example.

Image forming device database 5 is a database in which image forming device information 220 is stored.

For example, image forming device database 5 is a database connected to support server 1, and thus support server 1 can access the database.

The database may also be based on an SQL, for example.

[Hardware Configuration of Support Server 1]

Figure 2:
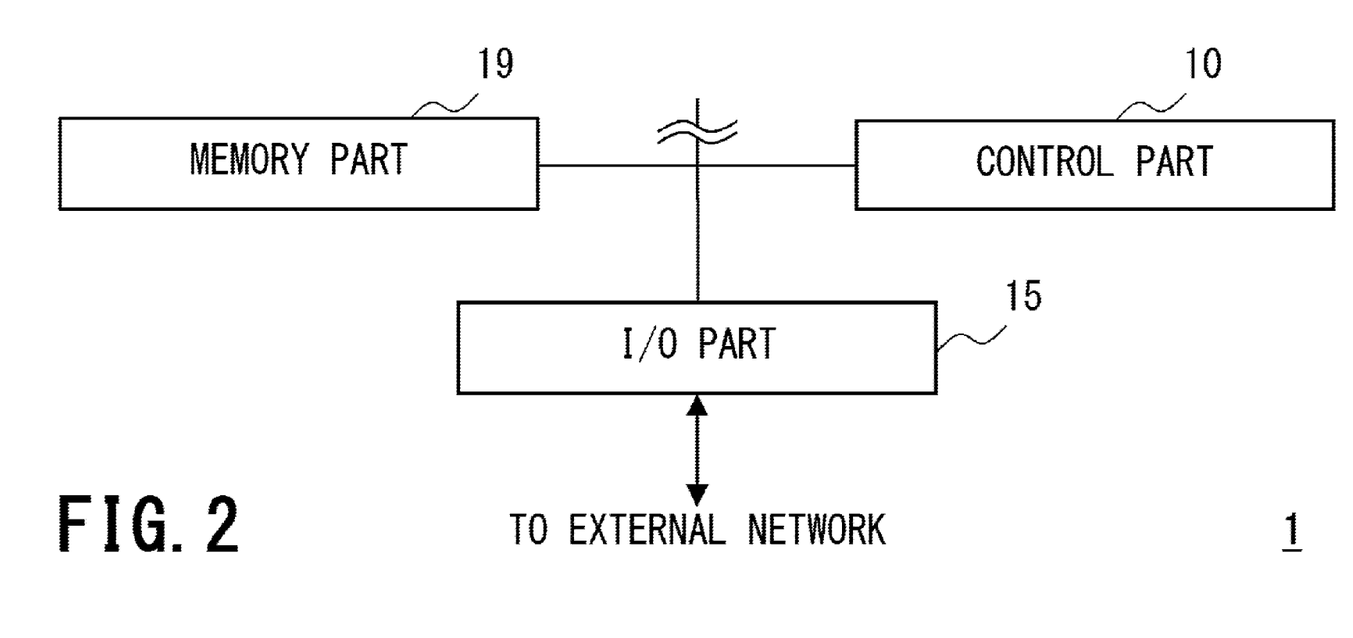
FIG. 2 is a block diagram showing a hardware configuration of the support server as shown in FIG. 1.

FIG. 2 is referred to.

Support server 1 includes control part 10, I/O part 15, and the memory part 19, or the like, as main hardware.

Each part is connected to control part 10, and each part is operation-controlled by control part 10.

Control part 10 is an information processing unit, such as CPU (Central Processing Unit.)

Control part 10 reads a control program stored in ROM or HDD in memory part 19, expands to RAM, executes this control program, and is operated as each of a functional block as described later.

Also, control part 10 controls a whole device corresponding to specified instructions information inputted from input part, such as terminal 2 or a console.

I/O part 15 is a circuit that is a so-called "chip set," or the like, and has various interfaces for transmitting and receiving data, or the like.

Memory part 19 is non-transitory recording media, which is semiconductor memory, such as ROM (Read Only Memory), RAM (Random Access Memory), and a flash memory, HDD (Hard Disk Drive,) or the like.

In addition to the various data as described later, a control program for operation-controlling support server 1 is stored in ROM and HDD, or the like, in memory part 19.

Memory part 19 may be managed in the area divided for each device, each partition, and each user.

Also, memory part 19 may be removable, and contents of record may be installed from another non-transitory recording media or may be backed-up.

In addition, in support server 1, control part 10 and I/O part 15 may be integrally formed as like the so-called SOC (System On Chip,) or CPU built-in GPU.

Also, control part 10 and I/O part 15 may contain a non-transitory recording medium, such as RAM, ROM, and a flash memory.

Also, support server 1 may be provided with other hardware units.

[Control Configuration of Support Server 1]

Figure 3:
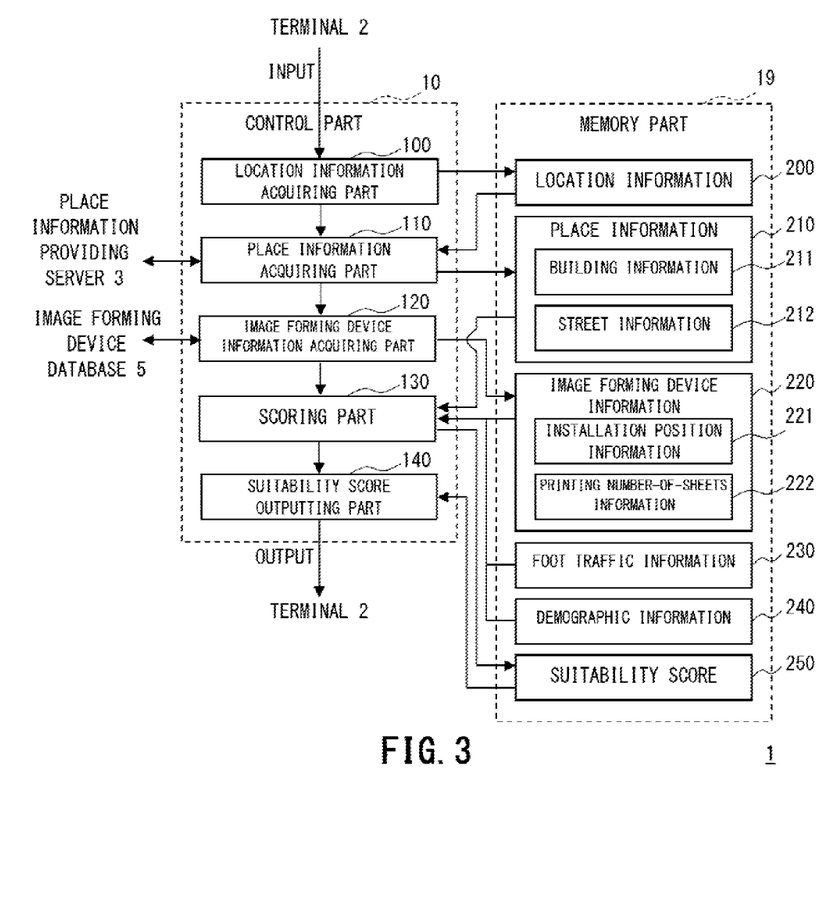
FIG. 3 is a block diagram showing a control configuration of the support server as shown in FIG. 1.

Here, the control configuration of support server 1 is explained with reference to FIG. 3.

Control part 10 in support server 1 includes location information acquiring part 100, place information acquiring part 110, image forming device information acquiring part 120, scoring part 130, and suitability score outputting part 140.

Memory part 19 stores location information 200, place information 210, image forming device information 220, foot traffic information 230, demographic information 240, and suitability score 250.

Location information acquiring part 100 inputs location information 200 from terminal 2.

For example, location information acquiring part 100 can obtain location information 200 with a network, connection wiring, or the like.

Place information acquiring part 110 obtains place information 210 including a nearby building and street in an address corresponding to location information 200 obtained by location information acquiring part 100.

For example, place information acquiring part 110 transmits location information 200 and information which specifies a type of building and street to place information providing server 3, and place information acquiring part 110 obtains place information 210 including the specified type of building and street as the reply.

For example, place information acquiring part 110 may access place information providing server 3 by using place information acquisition API.

Image forming device information acquiring part 120 obtains image forming device information 220 including installation location information 221 and printing number-of-sheets information 222 for a nearby image forming device in the address corresponding to location information 200 obtained by location information acquiring part 100.

For example, image forming device information acquiring part 120 searches image forming device database 5 by using location information 200.

If an image forming device exists around the place/point corresponding to the address included in location information 200, image forming device information acquiring part 120 obtains variety of information of this image forming device as image forming device information 220.

Scoring part 130 calculates suitability score 250 as a new print shop's installation location by using place information 210 obtained by place information acquiring part 110 and image forming device information 220 obtained by image forming device information acquiring part 120.

In detail, if a school, a going-out place, a traveler landmark, or area classification of a downtown or a business district is set to the building information 211 in place information 210, scoring part 130 increases suitability score 250.

In this case, scoring part 130 also computes each distance from the address corresponding to location information 200 to the address of each building information 211 in place information 210.

This distance may be linear distance or may be distance along the street by using street information 212.

Also, scoring part 130 decreases suitability score 250 in inverse proportion to the distance of a nearby image forming device and increases suitability score 250 in proportion to printing number of sheets.

In this case, scoring part 130 also computes each distance from the address corresponding to location information 200 to the image forming device.

Also, scoring part 130 may add foot traffic information 230 and demographic information 240 corresponding to the address of location information 200 obtained by location information acquiring part 100 to suitability score 250 as a constant.

Also, scoring part 130 restricts suitability score 250 in a specific range.

The specific range is preferred to adopt the range intelligible for a user, such as 0 to 10.

Suitability score outputting part 140 outputs suitability score 250 calculated by scoring part 130 as a result.

Suitability score outputting part 140 may output suitability score 250 to terminal 2 or may output it to another server, a print sheet, or the like.

location information 200 is information inputted by terminal 2 and includes an address, or the like.

The address may be enough information to obtain place information 210.

The location information 200 may be coordinates of a current location on the earth, or the like.

Positioning of the coordinates may be performed by GPS (Global Positioning System) in terminal 2, or the like.

In this case, the address may be specified by the coordinates.

Place information 210 is information on a map including a nearby building and street of the place/point corresponding to an address.

For example, the place information 210 is the data obtained by place information acquisition API.

Place information 210 may include an image data of a map, building information 211, and street information 212.

Building information 211 includes a type of a building, coordinates, or the like.

Street information 212 includes a type of a street, such as a sidewalk and a driveway, coordinates, or the like.

In detail, the building of place information 210 includes at least one of a school, a going-out place, a traveler landmark, area classification, and a big box retailer.

Schools are a university, a college, and a high school, for example.

Also, going-out places are a park, an arena, and a coliseum, for example.

Image forming device information 220 is information including installation location information 221 and printing number-of-sheets information 222 for an image forming device.

For example, installation location information 221 is information of an address in an installed location, or the like.

Also, printing number-of-sheets information 222 may include a historical average printing number of sheets per month and/or per day.

In addition, image forming device information 220 may include information for an entrepreneur's type or a scale, information for a model or a type of the image forming device, or the like.

As a type of this image forming device, for example, the classification corresponding to various purposes, such as a dry-type electrophotography type, an inkjet type, and a photolithography type, may be included.

Also, image forming device information 220 may include competitor's information.

The competitor's information includes information of the competitor's building and/or the street (location) acquired from place information providing server 3.

Foot traffic information 230 is information of foot traffic corresponding to an address.

For example, foot traffic information 230 may include information for a number of the average foot traffic for each day of the week about a nearby street on the place set by the address.

Foot traffic information 230 relates to the number of potential customers.

Demographic information 240 is information that shows population corresponding to an address.

For example, demographic information 240 may include information that a place is a city or a country.

Also, demographic information 240 may include information of a daytime population and a nighttime population.

Also, demographic information 240 may include demographic data whether population is increasing or decreasing over a long period or a short period.

In addition, foot traffic information 230, demographic information 240, or the like, can be collected from a server on the cloud, or the like.

Suitability score 250 is an appropriate measure (suitability score) about allocation of the image forming device for establishing or relocating a print shop calculated by scoring part 130.

For example, suitability score 250 may be a value of a specific range.

Here, by executing the control program stored in memory part 19, control part 10 in support server 1 functions as location information acquiring part 100, place information acquiring part 110, image forming device information acquiring part 120, scoring part 130, and suitability score outputting part 140.

Also, as above-mentioned, each part of support server 1 serves as hardware resources that execute the image forming method in the present disclosure.

[Image Forming Device Allocation Suitability Score Calculation Process by Support Server 1]

Figure 4:
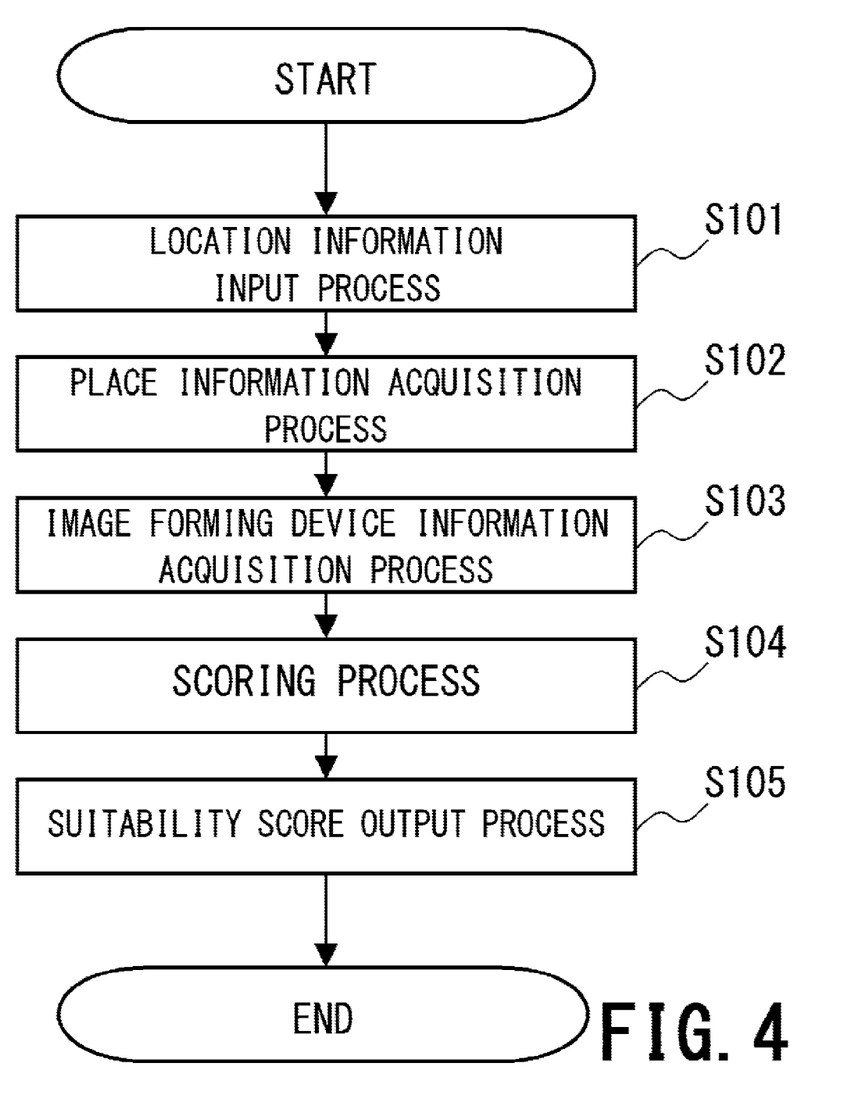
FIG. 4 is a flow chart of the image forming device allocation suitability score calculation process according to the embodiment in the present disclosure.
Figure 5:
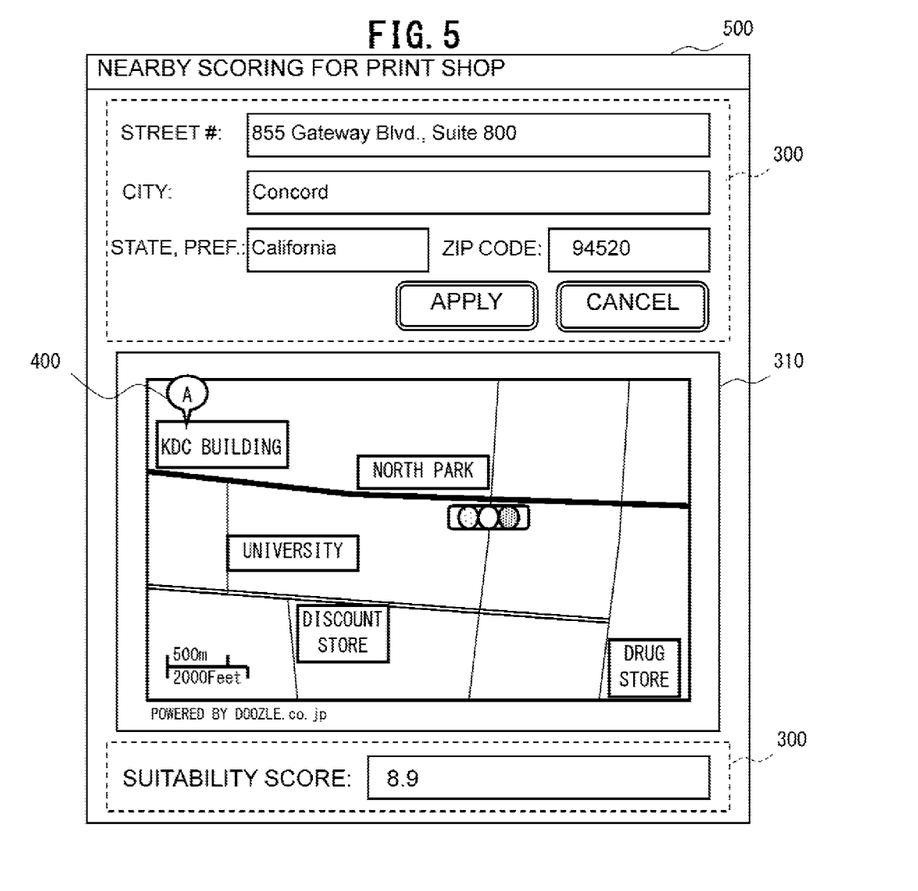
FIG. 5 is a conceptual diagram of the scoring process as shown in FIG. 4.
Figure 6:
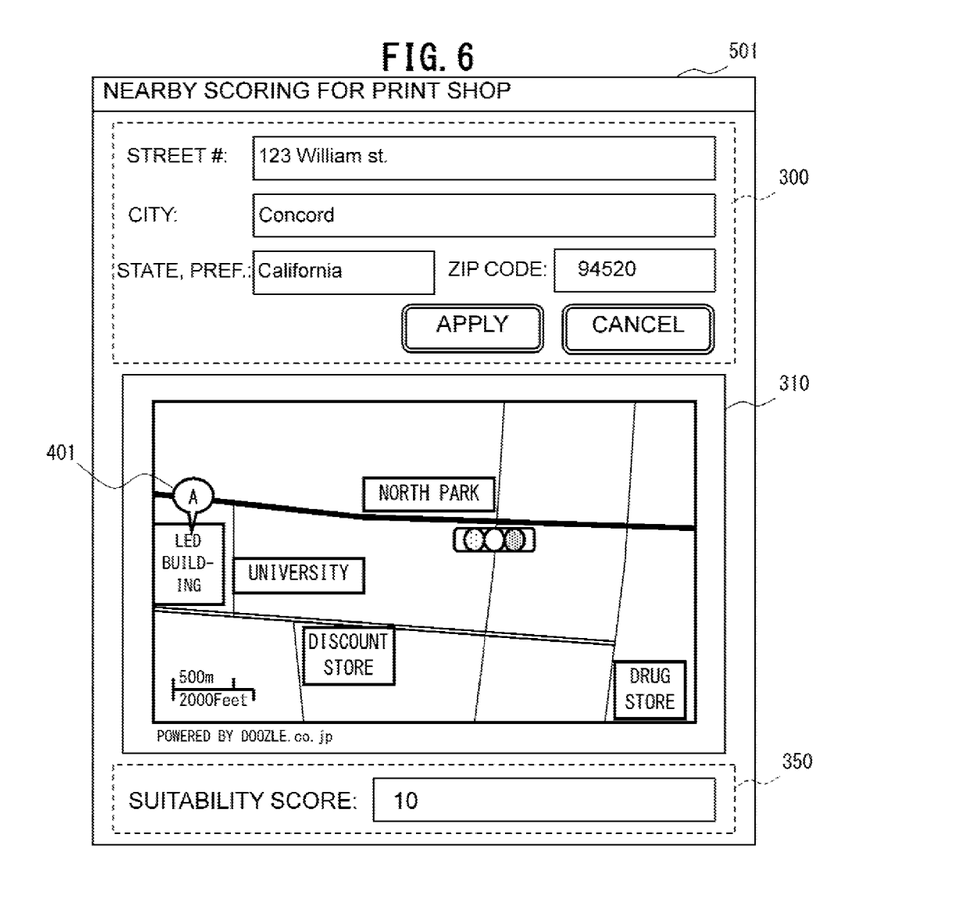
FIG. 6 is another conceptual diagram of the scoring process shown in FIG. 4.

Next, with reference from FIG. 4 to FIG. 6, the image forming device allocation suitability score calculation process by support server 1 according to the embodiment in the present disclosure is explained.

The image forming device allocation suitability score calculation process of the present embodiment is a process of a nearby scoring for image forming device installation.

In the image forming device allocation suitability score calculation process, location information 200 is inputted from terminal 2 for a user.

Then, place information 210 including a nearby building and street of an address corresponding to obtained location information 200 is obtained.

Also, image forming device information 220 including installation location information 221 and printing number-of-sheets information 222 for a nearby image forming device on the address corresponding to obtained location information 200 is obtained.

Further, suitability score 250 as a new print shop's installation location is calculated by using obtained place information 210 and obtained image forming device information 220.

In this case, (1) in consideration for school, a city, and a location, scoring whether to be good or not is performed to set an image forming device.

Also, (2) if it is good for the installation location for the image forming device, suitability score 250 becomes higher.

(3) If it is close to school, printing frequency becomes higher, and thus suitability score 250 can be higher.

Also, (4) if a tourist spot is near, suitability score 250 can be higher.

(5) however, if a competitor is being near, suitability score 250 becomes lower.

The calculated suitability score 250 is outputted to terminal 2, or the like.

For the image forming device allocation suitability score calculation process of the present embodiment, control part 10 collaborates with each part and mainly executes the program stored in memory part 19 by using hardware resources.

In the following, with reference to the flow chart of FIG. 4, the details of an image forming device allocation suitability score calculation process are explained for each step.

(Step S101)

At first, control part 10 as location information acquiring part 100 performs a location information input process.

Control part 10 receives location information 200 inputted by a user from terminal 2 and stores it in memory part 19.

(Step S102)

Then, control part 10 as place information acquiring part 110 performs place information acquisition process.

Control part 10 transmits location information 200 and information specified a type of a building and a street to obtain, which are stored in memory part 19, to place information providing server 3.

Then, place information providing server 3 searches this information by using place information database 4 and replies searched results to support server 1.

Control part 10 receives the results and stored it in memory part 19 as place information 210.

Place information 210 includes location information 200, and building information 211 and street information 212 nearby the place/point corresponding to the address of the location information 200.

That is, the competitor's information, the location information of a park, a school, or the like, is included in these information.

(Step S103)

Then, control part 10 as image forming device information acquiring part 120 performs an image forming device information acquisition process.

Control part 10 searches place information database 4 by using location information 200 stored in memory part 19.

Further, control part 10 obtains nearby image forming device information 220 on the address corresponding to location information 200.

The image forming device information 220 includes installation location information 221 and printing number-of-sheets information 222 for an image forming device.

(Step S104)

Next, control part 10 as scoring part 130 performs a scoring process.

For example, control part 10 calculates each distance from the address of location information 200.

Further, control part 10 calculates suitability score 250 based on place information 210 and image forming device information 220 by using the following sample equation (1).

Suitability score 250=+1/distance from each school (a university, a college, and a high school)+0.5/distance from each going-out place (a park, an arena, or coliseum)+0.7/distance from each traveler landmark (tourist spot)+0.5/distance from area classification (a downtown or a business district)−0.5/distance from each big box retailer (a discount store, a convenience store, or a drugstore)−0.3/distance from a nearby image forming device (other print shop)+(average printing number of sheets for every day in the respective image forming device/100)   equation (1)

That is, control part 10 increases suitability score 250 if there is a school, a going-out place, a traveler landmark, an area classification of a downtown or a business district in the building of place information 210.

Also, control part 10 decreases suitability score 250 in inverse proportion to the distance from a nearby image forming device and increases suitability score 250 in proportion to printing number of sheets.

In addition, as consideration of other parameters, control part 10 may calculate a constant value and add to suitability score 250 by using foot traffic information 230 and demographic information 240.

If there is much foot traffic in the area, control part 10 makes a constant value higher.

Also, if the population of the city or the town is large, control part 10 makes a constant value higher.

Subsequently, control part 10 restricts suitability score 250 to the specific range, such as 0-10, for example.

In these, 0 is the lowest and 10 is the highest for scoring.

(Step S105)

Next, control part 10 as suitability score outputting part 140 performs a suitability score output process.

Suitability score 250 calculated by scoring part 130 is outputted to terminal 2, or the like, as a result.

As above-mentioned, the image forming device allocation suitability score calculation process according to the embodiment in the present disclosure is ended.

[Example of Scoring Process]

As refer to an example in FIG. 5, a detailed example of the scoring process in Step S104 as shown in FIG. 4 is explained.

On example screen 500 in FIG. 5, the address of "KDC building" is inputted into location information input column 300 by the user.

The "apply" button is pushed, this address is transmitted to support server 1 as location information 200.

In place information display column 310, the image data, or the like, in place information 210 provided by place information providing server 3 is displayed.

Here, the location of the inputted address is displayed on image data as pin 400.

In this example, since a nearby image forming device is not present, image forming device information 220 is not obtained.

However, if a nearby image forming device is present and image forming device information 220 is obtained, the location of the respective image forming device can be displayed as overlapped on the image data.

Support server 1 calculates scoring based on this place information 210.

In detail, the example of FIG. 5, uses the distance from each building and the constant value such as:

A location is in within 0.5 miles of a university;

it is 2 miles away from a discount store;

it is 5 miles away from a drugstore;

it is 2 miles away from a community park (North park); and

Constant value=7

(This constant value is an example of a middle range of an initial value. The constant value is modified by the location as mentioned above.)

Suitability score 250=7(constant value)+1/0.5(university)−0.5/2(discount store)−0.5/5(drugstore)+0.5/2(park)=8.9

That is, 8.9 is displayed on suitability score display column 350 as suitability score 250.

Also, as refer to example screen 501 in FIG. 6, another case where the distance is 0.1 miles away from the university to the address of inputted location information 200 (LED building) is explained.

That is, in FIG. 6, the location of the address is shown in pin 401 as very close to the university.

In this case, other parameters are the same.

Suitability score 250=7(constant value)+1/0.1(university)−0.5/2(discount store)−0.5/5(drugstore)+0.5/2(park)=16.9

Here, although suitability score 250 is calculated as 16.9, it is restricted to the specific range as set to 10.

Therefore, suitability score 250 displayed on suitability score display column 350 is set to 10.

The following effects can be obtained with configuration as mentioned above.

The print shop owner needs to determine where a new print shop should be opened/relocated.

However, typical technology cannot show where a new print shop should be opened or should be relocated.

On the other hand, support server 1 according to the embodiment in the present disclosure is image forming device installation support server.

Support server 1 in the present embodiment includes:

location information acquiring part 100 that inputs location information 200 from terminal 2;

place information acquiring part 110 that obtains place information 210 including nearby building information 211 and street information 212 on an address corresponding to location information 200 obtained by location information acquiring part 100;

image forming device information acquiring part 120 that obtains image forming device information 220 including installation location information 221 and printing number-of-sheets information 222 of a nearby image forming device on the address corresponding to location information 200 obtained by location information acquiring part 100;

scoring part 130 that calculates suitability score 250 as a new print shop's installation location from place information 210 obtained by place information acquiring part 110 and image forming device information 220 obtained by image forming device information acquiring part 120; and suitability score outputting part 140 that outputs suitability score 250 calculated by scoring part 130.

Thus, by executing nearby scoring for image forming devices, useful information for considering where a new print shop should be opened or should be relocated can be provided.

That is, support server 1 in the present embodiment can advise to a user when installing an image forming device, opening a new print shop, or relocating the existing print shop.

Also, in support server 1 according to the embodiment in the present disclosure, the building of place information 210 includes at least one of a school, a going-out place, a traveler landmark, area classification, and a big box retailer.

As configured in this way, it enables to calculate reasonable suitability score 250 by using the information of a building that is important for print shops' demand.

Also, in support server 1 according to the embodiment in the present disclosure, scoring part 130, when a building of place information 210 has a school, a going-out place, a traveler landmark, an area classification of a downtown or a business district, increases suitability score 250.

As configured in this way, suitable scoring about a building important for print shops' demand can be performed, and a user can obtain affordable suitability score 250.

Also, in support server 1 according to the embodiment in the present disclosure, scoring part 130 decreases suitability score 250 in inverse proportion to a distance of a nearby image forming device and increases suitability score 250 in proportion to printing number of sheets.

As configured in this way, suitability score 250 can be decreased when a competitor exists.

However, when the number of sheets printed by the competitor is large, there is much demand.

Therefore, this can be reflected on scoring.

As a result, it becomes possible to calculate suitability score 250, appropriately.

That is, while considering in case that another print shop provider is in the circumference, a score can be added for a daily or monthly higher printing request.

Also, support server 1 according to the embodiment in the present disclosure, scoring part 130 restricts suitability score 250 in a specific range.

As configured in this way, as a calculation, even if suitability score 250 becomes too high or too low, suitability score 250 can be shown as a suitable range.

Thereby, it becomes convenient for a user to determine preferred suitability score 250.

Other Embodiments

In addition, when performing nearby scoring, suitability score 250 may be calculated by considering about a type of image forming device included in image forming device information 220.

In this case, at the time of inputting location information 200 by a user, information on purpose of a print shop the user opens can also be inputted. This information may include information on which the user opens a print shop for photograph as the main target or opens a print shop for business printings, for example (hereafter expressed as "use information").

Then, if the competitor has opened the print shop having the image forming device of a different type from the use information for the user, suitability score 250 can be increased.

As contrary, if the competitor has opened the print shop for the same purpose to the use information, suitability score 250 can be decreased.

Also, different scoring may be performed by use information about a going-out place, a business district, or a school.

That is, in the case where the use information is set for the photograph as the main targets, if a going-out place is near, the score becomes higher, in a business district, a score becomes lower, and in a school, it may be the middle.

Similarly, in the case where the use information is set for the business printing as the main targets, if a business district is near, a score gives higher, in a going-out place, a score becomes lower, and in a school, it may be the middle.

As configured in this way, suitability score 250 along the user intention is computable.

Also, in an above-mentioned embodiment, although the example that makes a user set a fixed address, it is not limited as like that way.

For example, as like a mesh, in a specific area centering on a location of a specific address, it is also possible to select suitable leasehold property to calculate suitability score 250, respectively, and shows it to a user.

The information about leasehold property is acquirable from the server on the cloud, or the like.

In this case, the suitability score may be calculated by combining the information on rental fee and profits.

Also, it may point out about the building where suitability score 250 is the highest, or a bar graph or a color graph may be superimposed on the image data of a map and may be displayed.

Also, the present disclosure is applicable to a print shop including information processing equipment other than an image forming device.

That is, it may take into consideration also about the configuration in which the network scanner and the scanner by USB, or the like, is connected.

Also, the configuration and operation of the above-mentioned embodiment are an example, and it cannot be overemphasized that it can modify suitably and can execute in the range that does not deviate from the aim of the present disclosure.

What is claimed is:

1. An image forming device installation support server comprising:
    a location information acquiring part that inputs location information from a terminal;
    a place information acquiring part that obtains place information including a street and building information nearby an address corresponding to the location information obtained by the location information acquiring part, wherein the building information includes a building type for each of a plurality of buildings nearby the address corresponding to the location information;
    an image forming device information acquiring part that obtains image forming device information including an installed location and printed number of sheets of an image forming device nearby the address corresponding to the location information obtained by the location information acquiring part;
    a scoring part that calculates a suitability score of installing a new print shop at the address corresponding to the location information by using the place information obtained by the place information acquiring part and the image forming device information obtained by the image forming device information acquiring part, wherein the scoring part:
        determines whether each of the building types comprised by the building information increases or decreases printing demand of the address corresponding to the location information;
        for each of the building types included in the building information, increases the suitability score when the printing demand is increased and decreases the suitability score when the demand is decreased; and
        increases the suitability score in proportion to the printed number of sheets of the nearby image forming device; and
    a suitability score outputting part that outputs the suitability score calculated by the scoring part and outputs from image data a graphic map of the location of the address corresponding to the location information and the location of the buildings corresponding to the building information, wherein the buildings corresponding to the building information are labeled with the respective building type.

2. The image forming device installation support server according to claim 1, wherein
    the building types of the place information includes at least one of a school, a going-out place, a traveler landmark, area classification, and a big box retailer.

3. The image forming device installation support server according to claim 2, wherein
    the scoring part increases the suitability score when the building types in the place information include at least one of the school, the going-out place, the traveler landmark, and area classification of a downtown or a business district.

4. The image forming device installation support server according to claim 2, wherein
    the scoring part decreases the suitability score when the building types of the place information include the big box retailer.

5. The image forming device installation support server according to claim 1, wherein
    the scoring part decreases the suitability score in inverse proportion to the distance between the address corresponding to the location information and the nearby image forming device.

6. The image forming device installation support server according to claim 1, wherein
    the scoring part changes the suitability score corresponding to an existence of a competitor nearby the address corresponding to the location information;
    the scoring part changes the suitability score based on a comparison of a type of imaging forming device comprised by the nearby competitor and a type of image forming apparatus comprised by the new print shop;
    the scoring part increases the suitability score when the type of imaging forming device comprised by the nearby competitor is different than the type of image forming apparatus comprised by the new print shop; and
    the scoring part decreases the suitability score when the type of imaging forming device comprised by the nearby competitor is the same as the type of image forming apparatus comprised by the new print shop.

7. The image forming device installation support server according to claim 1, wherein
    the scoring part restricts the suitability score in a specific range.

8. An image forming device installation support method comprising the steps of:
    inputting location information from a terminal;
    obtaining place information including a street and building information nearby an address corresponding to the obtained location information, wherein the building information includes a building type for each of a plurality of buildings nearby the address corresponding to the location information;
    obtaining image forming device information including an installed location and printed number of sheets of an image forming device nearby the address corresponding to the obtained location information;
    calculating a suitability score of installing a new print shop at the address corresponding to the location information by using the obtained place information and the obtained image forming device information, wherein the step of calculating a suitability score comprises:
        determining whether each of the building types comprised by the building information increases or decreases printing demand of the address corresponding to the location information;
        for each of the building types included in the building information, increasing the suitability score when the printing demand is increased and decreasing the suitability score when the demand is decreased; and increasing the suitability score in proportion to the printed number of sheets of the nearby image forming device;

outputting the calculated suitability score; and then installing the new print shop at the address based on the suitability score.

9. The image forming device installation support method according to claim 8, wherein the building types of the place information includes at least one of a school, a going-out place, a traveler landmark, area classification, and a big box retailer.

10. The image forming device installation support method according to claim 9, further comprising a step of increasing the suitability score when the building types in the place information include at least one of the school, the going-out place, the traveler landmark, and area classification of a downtown or a business district.

11. The image forming device installation support method according to claim 9, further comprising a step of decreasing the suitability score when the building types of the place information include the big box retailer.

12. The image forming device installation support method according to claim 8, further comprising a step of decreasing the suitability score in inverse proportion to the distance between the address corresponding to the location information and the nearby image forming device.

13. The image forming device installation support method according to claim 8, further comprising a step of changing the suitability score corresponding to an existence of a competitor nearby the address corresponding to the location information, wherein the suitability score is changed based on a comparison of a type of imaging forming device comprised by the nearby competitor and a type of image forming apparatus comprised by the new print shop;

the suitability score is increased when the type of imaging forming device comprised by the nearby competitor is different than the type of image forming apparatus comprised by the new print shop; and the suitability score is decreased when the type of imaging forming device comprised by the nearby competitor is the same as the type of image forming apparatus comprised by the new print shop.

14. The image forming device installation support method according to claim 8, further comprising a step of restricting the suitability score in a specific range.

15. A non-transitory recording medium readable and executable by an image forming device installation support server, wherein the non-transitory recording medium stores a program comprising the steps of:

inputting location information from a terminal;

obtaining place information including street and building information nearby an address corresponding to the obtained location information, wherein the building information includes a building type for each of a plurality of buildings nearby the address corresponding to the location information;

obtaining image forming device information including an installed location and printed number of sheets of an image forming device nearby the address corresponding to the obtained location information;

calculating a suitability score of installing a new print shop at the address corresponding to the location information by using the obtained place information and the obtained image forming device information, wherein the step of calculating a suitability score comprises:

determining whether each of the building types comprised by the building information increases or decreases printing demand of the address corresponding to the location information;

for each of the building types included in the building information, increasing the suitability score when the printing demand is increased and decreasing the suitability score when the demand is decreased; and increasing the suitability score in proportion to the printed number of sheets of the nearby image forming device; and outputting the calculated suitability score and a map illustrating the location of the address corresponding to the location information and the location of the buildings corresponding to the building information, wherein the buildings corresponding to the building information is labeled with the respective building type.

16. The non-transitory recording medium according to claim 15, wherein the building types of the place information include at least one of a school, a going-out place, a traveler landmark, area classification, and a big box retailer.

17. The non-transitory recording medium according to claim 16, wherein the program further comprises a step of increasing the suitability score when the building types in the place information include at least one of the school, the going-out place, the traveler landmark, and area classification of a downtown or a business district.

18. The non-transitory recording medium according to claim 16, wherein the program further comprises a step of decreasing the suitability score when the building types of the place information include the big box retailer.

19. The non-transitory recording medium according to claim 15, wherein the program further comprises a step of decreasing the suitability score in inverse proportion to the distance between the address corresponding to the location information and the nearby image forming device.

20. The non-transitory recording medium according to claim 15, wherein the program further comprises a step of restricting the suitability score in a specific range.

* * * * *